Jan. 20, 1959  B. CRETIN-MAITENAZ  2,869,422
MULTIFOCAL LENS HAVING A LOCALLY VARIABLE POWER
Filed Nov. 23, 1954  3 Sheets-Sheet 1

Jan. 20, 1959 B. CRETIN-MAITENAZ 2,869,422
MULTIFOCAL LENS HAVING A LOCALLY VARIABLE POWER
Filed Nov. 23, 1954 3 Sheets-Sheet 2

United States Patent Office 2,869,422
Patented Jan. 20, 1959

2,869,422

MULTIFOCAL LENS HAVING A LOCALLY VARIABLE POWER

Bernard Cretin-Maitenaz, Joinville-le-Pont, France, assignor to Societe en commandite simple et en nom collectif à l'egard de Gerants, dite: Societe Industrielle et Commerciale des Ouvriers Lunetiers (Cottet, Poichet, Tagnon & Cie), Paris, France Application November 23, 1954, Serial No. 470,755

Claims priority, application France November 25, 1953

2 Claims. (Cl. 88—54)

In conventional optical systems the light beam from which the image is formed covers generally the whole of the surface in the system. The surfaces usually employed are plane, spherical, toroidal, parabolic, elliptical or hyperbolic; in other words, they constantly offer two planes of symmetry or an axis of revolution.

These types of surfaces are also employed in other optical systems wherein the image is formed from a light beam affecting only one portion of the surface available in the system. Thus, the image is formed in the same manner, except for the aberrations, whether one or another portion of the surface of the system is affected by the light beam.

Various procedures have already been suggested for modifying the image formation in a given region, such as partial cutting, local insertion of optical elements, etc. One typical example is constituted by bi-focus or multi-focus glasses employed in spectacle production. With these methods employing the juxtaposition of surfaces any possibility of continuous variation in the optical properties is removed completely.

According to this invention this possibility is obtained in that one or more surfaces, termed hereinafter "progressive surfaces," are employed in the optical system. One characteristic feature of this progressive surface is that it possesses at the most only one plane of symmetry. On the other hand, this surface is characterized in that at each point thereof the two radii of curvature of sections conducted in two normal orthogonal planes, and notably the two principal normal planes which are the normal planes giving the sections of maximum and minimum curvature, respectively, are very close, and at certain points, equal to each other, and also in that these radii vary continuously from one point to another, taken at random on said surface.

A light beam impinging on any desired portion of this progressive surface will be refracted or reflected as if it were refracted or reflected by a sphere of same radius as the osculating sphere of the progressive surface at the specific point considered.

Thus, the reflecting or refracting properties will vary as the point of intersection between the light beam and the surface is displaced over this surface, this variation occurring in a definitely progressive manner.

In the specific case of spectacle glasses the power distribution may be selected with a view to complete or replace the crystalline lens accomodation of presbyopic or aphacial individuals.

Now it is the object of this invention to provide, as a novel industrial product, optical systems characterized in that at least one of their surfaces or at least one portion of one of their surfaces, is a progressive surface as defined hereinabove.

It is another object of this invention to provide a method of obtaining these progressive surfaces.

This method consists in causing a first cam rigid with the glass to be cut to roll over the working profile or surface of another cam rigid with the bearings of a grinding wheel, both cams being so shaped that during the rolling of the cams on each other the grinding wheel will cut a surface which, when seen in a section taken upon a plane at right angles to the momentary axis of rolling of the cams, has a profile whose radius of curvature has a value of or close to $$\frac{R}{\cos \alpha}$$

R being the active radius of the grinding wheel and $\alpha$ the angle between the normal to said profile and the radius of the grinding wheel in said sectional plane.

An alternate method of generating these glass curvatures consists in mounting the glass to be cut in rigid relationship to a cam whose profile engaging a small bar pivoted about the wearing point of the grinding wheel corresponds to the evolute profile of the selected glass, this cam being guided by a bearing engaging another cam so designed that the point of contact between the small bar and the profile of the first cam is constantly coincident with the axis of rotation of the grinding wheel.

Other features and advantages of the invention will appear as the following description proceeds with reference to the attached drawings forming part of this specification and illustrating diagrammatically by way of example a few forms of embodiment of the invention. In the drawings.

Figure 1:
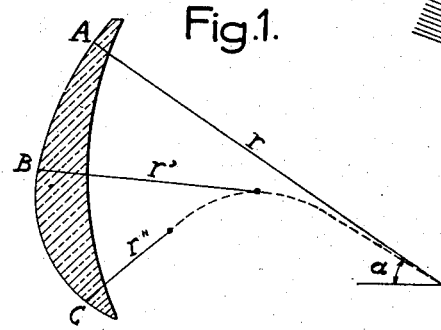
Figure 1 is a sectional view of a glass cut in accordance with the teachings of this invention and having its progressive surface on the convex side.

In the glass W shown in medial section in Fig. 1, the progressive surface is formed on the convex side, the concave side being spherical. The lens power—which, in this specific example, is only a function of the radius of curvature of the progressive surface—increases as the point of incidence of a light beam is displaced from A to C. In other words, in the curve L corresponding to the medial section of the glass, the principal radius of curvature $r$ at A is greater than the principal radius of curvature $r'$ at B, which is itself greater than the principal radius of curvature $r''$ at C. The principal radius of curvature varies continuously and according to a law given by a formula $r=f(\alpha)$ defined beforehand, wherein $\alpha$ is the angle of the normal to a predetermined constant direction.

Figure 2:
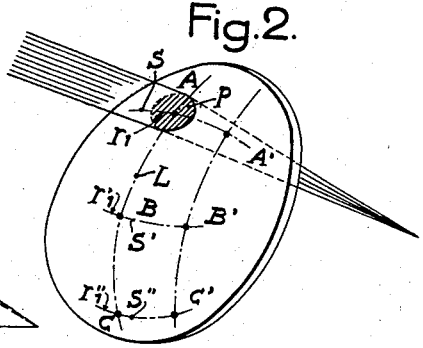
Figure 2 is a perspective view of the glass shown in Fig. 1.

As already explained hereinabove, the radii of curvature $r_1$, $r'_1$, $r''_1$ of sections S, S', S'' orthogonal to the medial section at A, B, C (Fig. 2) respectively, i. e., the other principal radii of curvature at points A, B and C, are substantially equal to $r$, $r'$, $r''$. The light beam utilized by the eye located behind the glass will cut in the surface a zone $p$ comprising the aforesaid point A. In this relatively small zone the surface will refract the light as would the osculating sphere of radius $r$. When the eye moves and the useful light beam passes successively through points A, B, C, the glass acts as a correcting glass with a lens power varying according to the angle of sight. Thus, for example, the power distribution will be calculated to produce the correction of the eyesight for the infinite at point A, for one yard at point B, and one foot at point C, with the desired progressiveness.

Practically, in the medial plane A, B, C of the glass, the radii of curvature $r$, $r'$, $r''$ may be strictly equal to $r_1$, $r'_1$, $r''_1$, respectively.

In another lateral plane A', B', C, of any desired position this strict equality of corresponding radii cannot be maintained; however, the surface profile will be designed with a view to reduce to a negligible value the light beam astigmatism resulting from the difference between these radii of curvature.

Figure 3:
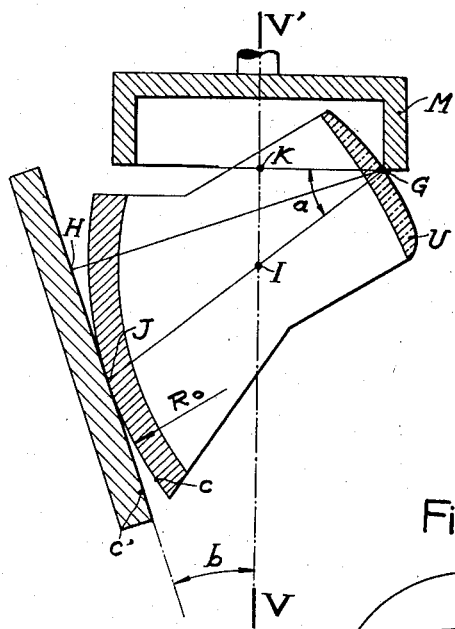
Figure 3 illustrates diagrammatically the method of manufacturing glasses of the type shown in Figs. 1 and 2.

Surfaces of the kind disclosed herein above may be obtained through various methods. A convenient method consists in causing a cylindrical cam $c$ of straight section to roll over another cylindrical cam $c'$ also of a straight section (Fig. 3), the glass to be cut being rigid with the straight-sectioned cam $c$, the grinding wheel M utilized for the glass cutting operation having its rotation bearings rigidly connected to the straight-sectioned cam $c'$. The grinding wheel M is of substantially cup shape and rotates about an axis V V'. The rolling movement of the two cams on each other takes place about a momentary axis of rotation disposed at right angles to the plane of the figure, at the point of contact J between the curves $c$ and $c'$. Thus, the grinding wheel M will cut in the glass a surface whose profile U positioned in the plane of the figure is the evolute of the grinding wheel section taken upon this plane of the figure. According to the cycloid theorem, it is known that this profile U admits as normal to the contact point G with the grinding wheel the straight line GJ connecting said point G to the momentary centre of rotation J of the cams for the position in which this grinding wheel is considered. The profile U is one of the principal sections of the glass surface at point G.

On the other hand, it is known that at this point G the radius of curvature $R_2$ of the section taken at right angles to the plane of the figure, which is the other principal section, has any moment a value $$GI = \frac{R}{\cos \alpha}$$

wherein R is the length of the working or active radius of the grinding wheel, and $\alpha$ the angle of the normal GJ to the fixed direction of the radius GK located in the plane of the figure. Now it is relatively easy to design the cams $c$ and $c'$ so that the profile U of the surface generated by the grinding Wheel M has at G a radius of curvature also equal to $$\frac{R}{\cos \alpha}$$

throughout the rolling of cam $c$ on cam $c'$. Under these conditions, the surface generated will be a true progressive surface as defined hereinabove, since $r$ and $r_1$ vary together and $r = r_1$ at any point of the section taken upon the plane of the figure; in the other sections $r$ will differ slightly from $r_1$, i. e. by an amount which can be calculated and is negligible if $c$ and $c'$ are suitably selected.

As a non-limitative example, an arrangement including a rectilinear cam $c'$ and a circular cam $c$ may be taken, wherein the rectilinear cam forming with the axis V V' an angle of 18 degrees, the circular cam $c$ having a radius $R_0$ of 205 millimeters, the grinding wheel M having an active or working radius R of 50 millimeters, the distance GH between the cutting point and the cam $c'$ being 137 millimeters.

The radii $r$, $r'$, $r''$ at A, B, C are then of 96, 72 and 55 millimeters respectively, thereby providing a lens power increase of 2.7 dioptres from A to C.

Figure 4:
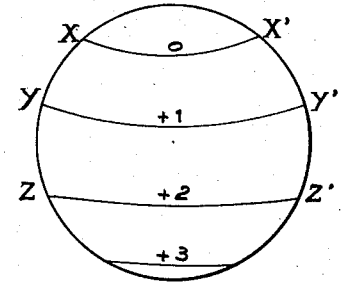
Figure 4 is a front view of the glass showing the dioptric power distribution over its surface.
Figure 5:
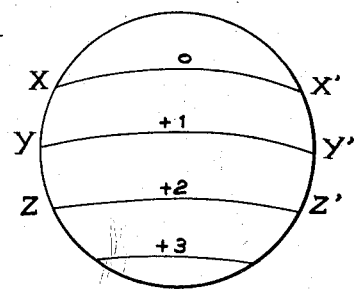
Figures 5, 6 and 7 are similar front views showing modified embodiments of the glass.

The arrangement of the cutting elements (see Fig. 3) provides a power distribution of the type illustrated in Fig. 4, wherein the lines XX', YY', ZZ' indicate diagrammatically on the glass surface the locations whereat the lens power is 0, 1, 2 dioptres, etc. By changing $c$ and $c'$ the general surface characteristics may be altered to obtain a different power distribution pattern (see Fig. 5). The differences in lens power between A, B, C, may be changed at will, by simply altering the cutting elements.

Figure 6:
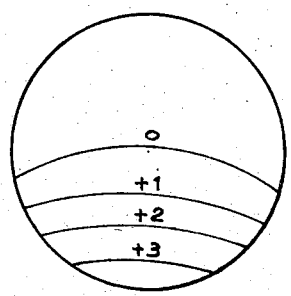
Figure 8:
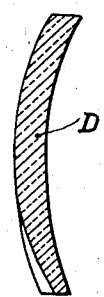
Figure 8 is a section taken upon the line VIII—VIII of Fig. 7.
Figure 7:
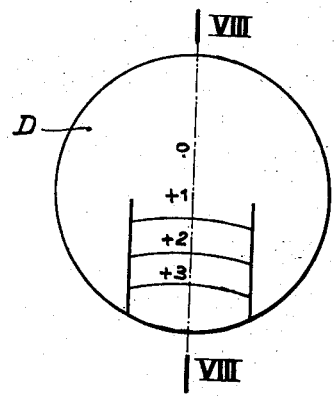

Of course, the examples described hereinabove are merely intended to illustrate the principle of the invention. It will be readily understood that this progressive surface may be utilized in different manners, for example, as permitted by the ophthalmic glass technique. Thus, the lower portion of the glass may be utilized to form the progressive surface according to the invention, the upper portion being of the conventional, constant-power type. These different surfaces may blend together in a completly invisible manner (Fig. 6) or, on the contrary, the glass D may be cut locally to form a progressive surface of reduced area as shown in front view in Fig. 7 and medial section in Fig. 8. Another possible embodiment consists in utilizing glass materials E and F having different indices, the refracting properties of these materials being combined with those of the progressive surface according to this invention.

Figure 10:
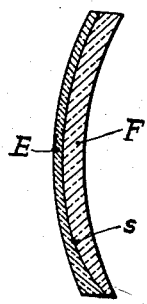
Figure 10 is a section taken upon the line X—X of Fig. 9.
Figure 9:
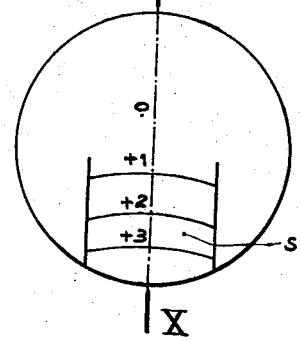
Figure 9 is a front view showing another alternate embodiment.

Fig. 10 shows in medial section an alternate embodiment of which Fig. 9 is a front view. In this example, the progressive surface with reduced field of vision is the assembling surface S, and the glass is formed with its usual—spherical, toroidal, etc.—outer surfaces.

Figure 11:
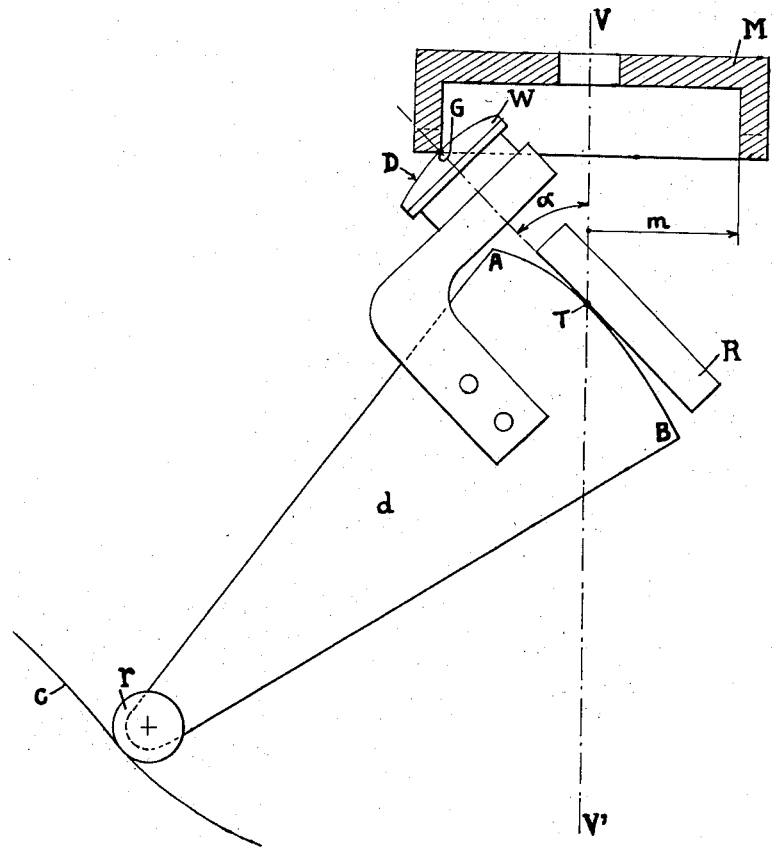
Figure 11 illustrates an alternate method of generating progressive surfaces (see Fig. 3).

Another method of generating progressive surfaces is illustrated in Fig. 11 of the drawings, wherein the glass W is rigid with a cam $d$ in rolling engagement with a small bar R. This small bar R is pivoted about the point G which is the projection of the point of wear of the grinding wheel on the plane of the figure. The bearing $r$ rolls on the cam face $c$ during the surface generation effected by the grinding wheel M rotating about an axis V V'.

To obtain a surface characterized by a variable and progressive power, the elements are so designed that the profile AB of the cam $d$ corresponds to the evolute of the profile D of the selected glass. Cam $c$ is selected to cause the contact point T between AB and R to be at any time coincident with the axis V V' of the grinding wheel M.

The glass surface D generated on the glass material is a true progressive surface since at any location the radius of curvature of the profile D in the plane of the figure is equal to TG at point G, and in the plane at right angles to the figure this radius of curvature is equal to $$\frac{m}{\sin \alpha}$$

$m$ being the radius of the grinding wheel and $\alpha$ the angle between TG and V V'; thus, $$TG = \frac{m}{\sin \alpha}$$

Therefore, the radii of the two orthogonal sections of the glass surface D at point G are equal to each other and to TG.

The profile of cam $c$ will be so designed that any displacement of the movable elements as the generation proceeds will properly maintain the contact point T on V V', so that the equality of the radii will be maintained throughout the profile.

This generation is advantageous with respect to that already described hereinabove in that the glass profile may be positively controlled at any time since the evolute of profile D is selected as the profile AB of $d$; thus, for each selected profile D it is possible to find a profile AB of $d$, then a cam profile $c$. With this procedure any desired surface contours can be obtained.

This surface generating method is applicable not only to the shaping of mineral glass lenses but also to the formation of mold cavities for producing plastic or organic lenses.

Although the above description refers essentially to a glass surface intended primarily for spectacle glasses, it will be readily understood by anybody conversant with the art that this technique is also applicable to any fields, even of extremely different characters, where a continuous variation in convergence is required.

What I claim is:

1. A multifocal lens of continuously varying focal power having one of its faces shaped in a surface with its medial curve extending across the lens and said medial curve having a continuously varying radius of curvature, the laterally disposed portions of the surface for a substantial distance on each side of said medial curve being substantially spherical in shape, the said substantially spherical surface of said laterally disposed portions being that of a generatrix curve which is a circular arc having a constant radius of substantially the same radius as the minimum radius of said medial curve, said generatrix curve moving along said medial curve and intersecting it orthogonally at all points but lying successively in planes inclined at different angles to the tangent of said medial curve at each successive point along said medial curve, the plane of the generatrix curve at each point on the medial curve being inclined relative to the tangent to the medial curve at said point at an angle of which the sine is the radius of the generatrix curve over the radius of curvature of the medial curve at said point so that a line normal to the plane of said generatrix curve at the center of said curve passes in each instance through the instantaneous center of curvature of the medial curve at said point, the surface thus defined having spherical curvature at each point along said medial curve and substantially spherical curvature for a substantial distance on each side of said medial curve and providing a lens surface of continuously varying power.

2. A multifocal lens of continuously varying focal power having one of its surfaces shaped so that its medial curve lying in a substantially median plane section of the lens has a progressively varying radius of curvature, the laterally disposed portions of the surface for a substantial distance on each side of said medial curve being substantially spherical in shape, the said substantially spherical surface of said laterally disposed portions being that of a generatrix curve which is an arc having a constant radius of curvature of substantially the same radius of curvature as the minimum radius of curvature of said medial curve, said generatrix curve moving along said medial curve and intersecting it orthogonally at all points but lying successively in planes inclined at different angles to the tangent of said medial curve at each successive point along said medial curve such that a line normal to the plane of said generatrix curve at the center of said curve passes in each instance through the instantaneous center of curvature of the medial curve at said point, the surface thus defined having spherical curvature at each point along said medial curve and substantially spherical curvature for a substantial distance on each side of said medial curve and providing a lens surface of progressively varying power.

References Cited in the file of this patent

UNITED STATES PATENTS

| | | |
|---|---|---|
| 805,438 | Bell | Nov. 28, 1905 |
| 1,143,316 | Poullain et al. | June 15, 1915 |
| 1,351,785 | Paige | Sept. 7, 1920 |
| 1,518,405 | Glancy | Dec. 9, 1924 |
| 2,001,952 | Birchall | May 21, 1935 |
| 2,109,474 | Evans | Mar. 1, 1938 |
| 2,310,925 | Bardwell et al. | Feb. 16, 1943 |
| 2,328,584 | Rones | Sept. 7, 1943 |
| 2,399,706 | Rones | May 7, 1946 |
| 2,405,989 | Beach | Aug. 20, 1946 |
| 2,410,145 | Bardwell et al. | Oct. 29, 1946 |
| 2,475,275 | Birchall | July 5, 1949 |
| 2,755,602 | Evans | July 24, 1956 |